Nov. 8, 1938.    F. C. BEST    2,136,271
MOTOR VEHICLE
Filed June 30, 1934
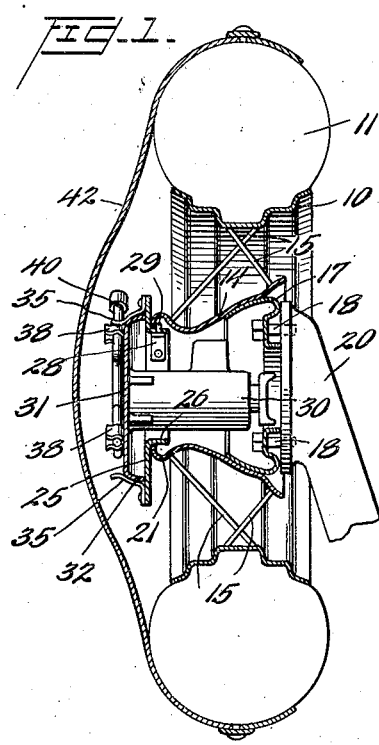
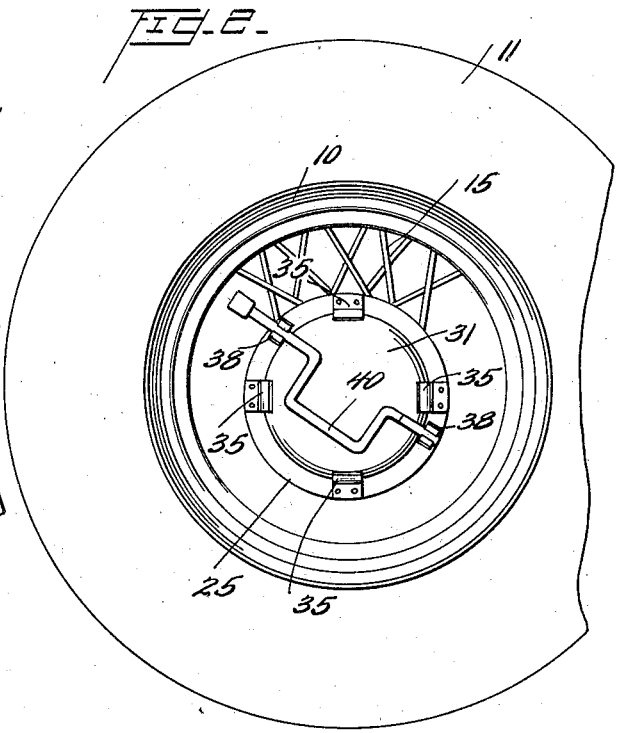
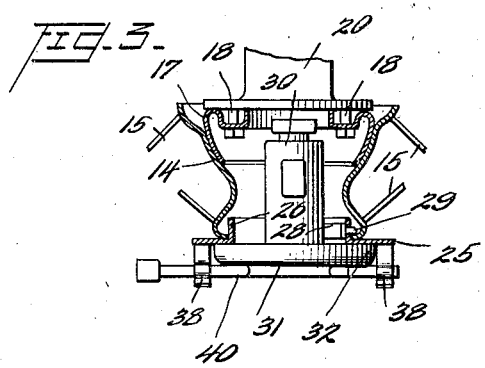
Inventor
F. C. Best,
By Bateon, Crit, Morse & Grindle.
Attorney Patented Nov. 8, 1938

2,136,271

UNITED STATES PATENT OFFICE 2,136,271

MOTOR VEHICLE

Frank C. Best, Detroit, Mich., assignor to Packard Motor Car Company, Detroit, Mich., a corporation of Michigan Application June 30, 1934, Serial No. 733,315

3 Claims. (Cl. 224—29)

This invention relates to motor vehicles and more particularly to an arrangement for facilitating the storage on the vehicle of accessories such as the usual vehicle jack and jack handle.

It is a feature of the invention that the vehicle jack is supported in association with the usual spare wheel of the vehicle, the jack being required under ordinary conditions only when wheel replacement is necessary. Thus the invention contemplates the disposition of the vehicle jack within the conventional hollow hub of the spare wheel, a support, preferably received by the hub in the same manner as the usual hub cap, maintaining the jack out of contact with the interior of the hub and against unintentional displacement.

In the preferred form of the invention a support having a part thereof constructed to conform largely to that portion of the hub cap which is received in the hub is employed in lieu of the hub cap and is provided with means yieldingly engaging both the jack and a handle therefor, the outer face of the wheel being preferably enclosed with the usual wheel cover so that both jack and handle are concealed from view.

An effort is frequently made to facilitate the storage of a vehicle jack by employing a base for the jack which is generally rectangular in plan having one small dimension so that it may be received in the relatively limited space available under the seat. However, any reduction in size of the jack base is dangerous since it is possible that when in use the jack will rock, permitting the car to fall. By means of the present invention the jack base may be made substantially circular so as to be equally resistant to rocking in all directions and of adequate area without sacrificing any storage space which might be used for other purposes.

Further objects and features of the invention will be apparent from the following description taken in connection with the accompanying drawing, in which Figure 1 is a vertical sectional view of a vehicle wheel shown in position on a spare wheel carrier with a jack in position within the wheel hub;

Figure 2 is a side elevation of the wheel shown in Figure 1; and

Figure 3 is a horizontal sectional view of the wheel hub and associated parts.

In describing the invention reference will be made to the preferred embodiment thereof illustrated in the drawing and detailed language will be employed. It will nevertheless be understood that no limitation of the scope of the invention is thereby intended, various modifications being contemplated such as would occur to one skilled in the art to which the invention relates.

Referring now to the drawing, it will be observed that the wheel disclosed therein is of the conventional type comprising a rim 10 having a tire 11 supported thereon, the rim being connected to the hollow hub 14 by means of spokes 15. At the inner end thereof the hub is provided with a wheel attaching flange 17 which is apertured to receive bolts 18. When the wheel is used as a spare, the bolts 18 are threaded into a wheel supporting bracket 20 which may be located at any convenient point on the vehicle, for instance at the rear. At its outer side the wheel hub 14 is provided with a beaded portion 21 within which a hub cap may be snugly fitted, suitable yielding means being provided on the hub cap to prevent unintentional displacement thereof. The construction thus far described is well-known and the details thereof form no part of the present invention.

It is proposed to employ, when the vehicle wheel is being carried as a spare, an accessory support which is constructed so as to conform in part to that portion of the usual hub cap which is received by the wheel. In other words, the support which is indicated at 25 is provided with an inturned annular flange 26 received snugly within the portion 21 of the hub 14 and provided with one or more flat spring elements 28 secured to the inner face of the flange 26 and having projections 29 thereon protruding through apertures in the flange 26, these projections springing out behind the end flange of the hub when the support 25 is forced in position. By means of this construction the support will be retained against unintentional displacement, it being understood that the invention contemplates the provision of other means of retention, but preferably some means corresponding to that employed in securing the hub cap in position. By this arrangement the hub cap can be removed when the wheel is to be used as a spare and can be readily replaced by the accessory support 25.

A vehicle jack 30 having a substantially circular base 31 with an upturned annular flange 32 defining the periphery thereof may extend within the hub 14 and be retained therein by means of a plurality of spring fingers 35, the latter being secured to the support 25 and engaging the base of the jack as indicated in Figure 1 of the drawing.

It will be appreciated that the base 31 of the jack might be constructed to conform in contour to the usual hub cap and thus be fitted directly within the wheel hub with the resultant elimination of the special support 25. I prefer, however, to employ a special support so as to accommodate a jack having a larger supporting base and a greater over-all length.

The support 25 is also preferably provided at diametrically spaced points with spring clips 38 which are of conventional construction and which engage the usual jack handle 40 to retain the latter in position, the handle being preferably formed with a socket at one end to permit use thereof as a wrench for the wheel attaching bolts. The assembly is completed by the fitting to the wheel of the usual spare wheel cover 42 which effectively conceals the jack and the handle.

The storage of a jack within the spare wheel is particularly advantageous since it is for the purpose of replacing the wheel that the jack is ordinarily required. However, the invention contemplates the storage of other accessories within and about the spare wheel cover and within the wheel hub and more particularly by means of a supporting bracket adapted to replace the usual wheel hub cap.

Having thus described the invention, what is claimed as new and desired to be secured by Letters Patent is:

1. In a structure of the class described, the combination with a vehicle wheel having a hollow hub and constructed to receive a detachable hub cap, of a vehicle jack supporting bracket having a portion thereof constructed to conform to that portion of the hub cap received in the hub, whereby said bracket may be readily fitted to and detached from said hub, said bracket having a plurality of spring fingers for engagement with the jack to yieldingly retain the latter in position within the hub.

2. In a motor vehicle, the combination with a spare wheel carrier, of a spare wheel supported thereby and having a hollow hub provided with a hub cap receiving portion, means receivable by said hub cap receiving portion of the hub, means for removably securing said first named means in fixed position with respect to the receiving portion of the hub, and means on said first means for clamping the base of a vehicle jack between the first and last means with the body of the jack extending within said hub.

3. In a structure of the class described, the combination with a spare vehicle wheel having a hollow hub open at the outer side, of means secured to said hub and having an opening affording access to the interior of the hub, said means acting to secure a vehicle jack in position in said hub with the longitudinal axis of the jack disposed in substantial parallelism with the hub axis and with the base of the jack positioned to close the opening in said means and in connection therewith the hub, and means to secure the jack to said first named means.

FRANK C. BEST.